(12) United States Patent
Müller

(10) Patent No.: US 7,417,632 B2
(45) Date of Patent: Aug. 26, 2008

(54) AUTOMATIC TESTING OF GRAPHICS PROGRAMS

(75) Inventor: Kay C. Müller, Heppenheim (DE)

(73) Assignee: SAP AG, Walldorf (DE)

( * ) Notice: Subject to any disclaimer, the term of this patent is extended or adjusted under 35 U.S.C. 154(b) by 496 days.

(21) Appl. No.: 11/003,818

(22) Filed: Dec. 2, 2004

(65) Prior Publication Data

US 2006/0132480 A1    Jun. 22, 2006

(51) Int. Cl.
*G06T 1/00* (2006.01)
*G06K 9/68* (2006.01)

(52) U.S. Cl. ............... 345/418; 345/522; 382/218; 382/219; 717/131

(58) Field of Classification Search ........... 345/418, 345/522, 600, 501, 533; 382/218–221, 100, 382/305, 276; 712/2–3, 7; 717/100, 131, 717/121, 127; 348/441, 445
See application file for complete search history.

(56) References Cited

U.S. PATENT DOCUMENTS

| | | | |
|---|---|---|---|
| 2001/0040700 A1* | 11/2001 | Hannuksela et al. | ..... 358/261.2 |
| 2002/0134133 A1* | 9/2002 | Ogawa | ..... 73/1.86 |
| 2002/0154111 A1* | 10/2002 | Webb | ..... 345/418 |
| 2002/0176627 A1* | 11/2002 | Monden | ..... 382/219 |
| 2003/0067637 A1* | 4/2003 | Hannuksela | ..... 358/504 |
| 2004/0044965 A1* | 3/2004 | Toyama et al. | ..... 715/523 |
| 2005/0122497 A1* | 6/2005 | Lyons et al. | ..... 355/53 |
| 2005/0134918 A1* | 6/2005 | Reed | ..... 358/3.01 |
| 2005/0204298 A1* | 9/2005 | Kemp | ..... 715/762 |
| 2005/0262430 A1* | 11/2005 | Croft | ..... 715/507 |
| 2005/0270289 A1* | 12/2005 | Momose | ..... 345/443 |
| 2006/0146719 A1* | 7/2006 | Sobek et al. | ..... 370/238 |

OTHER PUBLICATIONS

*JUnit Test Infected: Programmers Love Writing Tests*, Internet, http://junit.sourceforge.net/doc/testinfected/testing.htm, 11 pgs.
Compuware Corporation, *Compuware TestPartner: Next generation automation using existing QARun assets*, 2000-2002, The Apache Software Foundation.

* cited by examiner

*Primary Examiner*—Wesner Sajous
(74) *Attorney, Agent, or Firm*—Blakely, Sokoloff, Taylor & Zafman, LLP

(57) ABSTRACT

A method and system to automatically test graphical output. A graphical output is generated in a format that permits automatic comparison with a reference graphic. The reference graphic is created and retained in the test format. The test format reference graphic is compared with the test format output graphic. The results of the comparison are used to generate a report of the discrepancies between the reference graphic and the output graphic.

13 Claims, 3 Drawing Sheets

AUTOMATIC TESTING OF GRAPHICS PROGRAMS

BACKGROUND

1. Field

Embodiments of the invention relate to graphical testing. More specifically, embodiments of the invention relate to automated testing of graphical outputs of computer programs.

2. Background

A time consuming and expensive part of any software development is testing to insure that the developed software behaves in the expected and desired manner. Such testing must be repeated any time there is a code change in the software. This testing is particularly problematic in the context of programs that produce graphical output, such as business graphics, Gantt charts, etc. One problem with graphical output is that it cannot be tested in an automated fashion. Current testing protocols require visual inspection of all possible picture types that the software can produce against a master picture for the particular data set. This visual inspection is both time consuming and unreliable. The visual inspector may easily overlook small details of potentially very large graphic images. Additionally, such testing relies on the visual acuity of the particular tester, which may have high variability from one to the next. This further exacerbates the quality control problems of this testing regimen.

DETAILED DESCRIPTION

Figure 1:
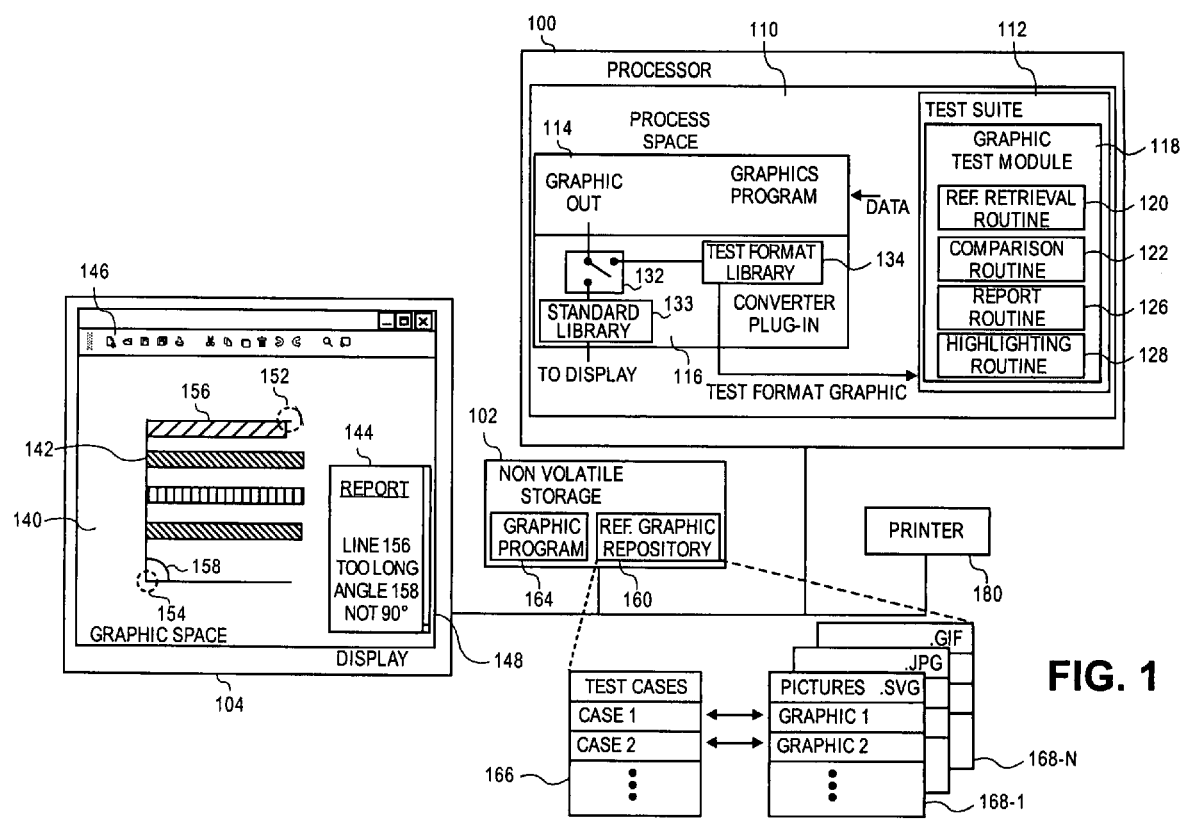
FIG. 1 is a block diagram of the system to provide automated testing of graphical output.

FIG. 1 is a block diagram of the system to provide automated testing of graphical output. A processor 100 may be communicatively coupled to a non-volatile storage unit 102. Non-volatile storage unit 102 may be a hard drive, a database, or any other non-volatile storage unit. In one embodiment, non-volatile storage unit 102 may contain a graphics program 164, which executes as graphics program 114 in the process space 110 of processor 100. In one embodiment, non-volatile storage unit 102 contains a reference graphic repository 160 in which the reference graphics, which form the basis of automated graphical testing, may be retained. The content of reference graphic repository 160 may include test cases 166 and corresponding sets of pictures 168-1 to 168-N. The test cases 166 may be the data that is provided to a graphics program 114 to generate a corresponding graphic in the set of pictures. In one embodiment, a test case is a Java object. This assumes a Java graphics program. Picture sets 168-1 to 168-N include reference graphics in each of a plurality of formats corresponding to the test cases 166. In this example, picture sets in scalable vector graphics (SVG), joint photographic expert group (JPEG) format, and graphics interchange format (GIF) are retained. In some embodiments, more or fewer formats of reference graphics may be returned.

A display 104 may also be communicatively coupled to processor 100. Display 104 has a display area, which includes a menu space 146 and a graphics space 140. The menu space 146 includes tool bars and menu headings, which may form the basis of a window. A graphics space 140 generally includes the content of that window. A printer 180 may also be communicatively coupled to the processor 100.

The processor 100 has a process space 110. Within the process space, a graphics program 114 may execute. As used herein, a graphics program is any program which generates graphical output, such as business graphics charting programs, etc. Typically, when the graphics program generates graphics commands as output, driven to the display via a graphics library. This operation is referred to herein as the normal mode.

In one embodiment, graphics program 114 provides an application programming interface (API) to permit a plug-in 116 to engage the graphics program to facilitate testing. The plug-in 116 includes a hook routine 132 which diverts the graphics commands from the graphics program 114 to a test format library 134, when the system is in a test mode. When the system is in the normal mode, the hook routine 132 does not divert the graphics command, but rather passes them to a standard library to be drawn to the display in the normal way.

In some embodiments, a reference graphic generation mode is provided. In reference graphic generation mode, the test case is provided to the graphics program 114 and the graphics commands output by the graphics program are diverted to an appropriate library to generate the reference graphic. In one embodiment, the graphics commands are sent to more than one library to generate a reference graphic in a plurality of formats. The generated reference graphics are then stored in association with the test case from which they were created. In another embodiment, the reference graphics and test cases may be provided by an external source and merely loaded into memory.

In some embodiments, in test mode the hook routine 132 may both divert and pass the graphics commands such that they are sent simultaneously or serially to both the test format library and the standard library. The graphic may then be simultaneously drawn to the screen and tested as explained below.

In some embodiments, test format library 134 may generate graphic output in a vector format, such as SVG format. Other vector format graphic libraries could be used. In another embodiment, the test format library 134 may generate a raster format, such as a bitmap, e.g., a JPEG or GIF format. The output of test format library 134 is the graphical output in a test format graphic, which in one example would be SVG format. Alternatively, a bitmap may be used as the test format. As explained below, using the bitmap as the test format provides benefits over the prior visual testing, but SVG as the test format may provide additional benefits.

SVG is a description language for graphics controlled by the W3C consortium and is non-proprietary. SVG is based on extensible markup language (XML) syntax and this permits graphics to be described as text. Particularly, a graphical image is described in terms of graphical elements, such as lines, angles, polygons, ellipses, text, etc. More complex objects, such as a half circle can also be defined and referenced using SVG. Generation of an SVG graphic results in an XML representation of the graphic. XML has the advantage of being both human and machine readable.

A test suite 112 may include several test modules to test various types of software. For example, test suite 112 may include a graphics test module 118. Graphics test module 118 may include several routines, including a reference retrieval routine 120, a comparison routine 122, a report routine 126 and a highlighting routine 128. In some embodiments, the highlighting routine may be a subroutine of the report routine or be called by the report routine 126.

In a test mode, hook routine 132 diverts graphical output from graphics program 114 through test format library 134, which generates the test format graphic to be supplied to graphic test module 118. In one embodiment, when graphic test module 118 receives the test format graphic, a reference retrieval routine 120 retrieves an appropriate reference graphic from repository 160 in non-volatile storage 102. Alternatively, as a prerequisite for entering test mode, reference retrieval routine 120 may load the relevant reference graphics into a volatile memory, such as the processor's internal cache (not shown) or dynamic random access memory (DRAM) (not shown). The reference retrieval routine may then retrieve the reference graphics from volatile memory as needed and/or requested by the comparison routine 122.

Comparison routine 122 performs an automatic comparison between the test format graphic and the reference graphic provided by the reference retrieval routine 120. Where the test format graphic is a bitmap, a bit by bit comparison may be performed to identify pixels that are different between the test graphic and the reference graphic. Alternatively, if the test format graphic is in an SVG format, a tag-by-tag comparison may be performed by stepping through the corresponding XML tags to identify differences. Because XML is text based, this is effectively a text comparison. If the text representation (XML representation) of the test graphic matches the reference graphic the test graphic passes. If not the test graphic fails.

The comparison routine 122 provides the results of the comparison to the report routine, which in various embodiments of the invention may generate different types of reports. In one embodiment, the report routine 126 generates a text report, which may be output to either the display 104 or printer 180. In another embodiment, report routine 126 may generate both a text report and highlight discrepancies in the graphics in the graphics space 140 of display 104. The report routine 126 may use a highlighting routine 128 to accomplish a desired highlighting. By highlighting, it is meant that the area highlighted is set off in some manner from its surroundings. In various embodiments, this may take the form of a color change either background or the element itself, a change in brightness, a bounding circle or bounding box, arrows, or any other mechanism by which emphasis can be placed on a portion of a graphic.

In one embodiment, a text report may appear in a separate window 144 tiled over the graphic space. The window 144 may include a scroll bar 148 to permit a user to scroll through the report so it does not occupy an unnecessarily large portion of the graphics space. In some embodiments, the window 144 may be moveable and/or scalable within the graphics space 140. The graphic to be tested may concurrently be displayed in the graphic space 140 with the discrepancies highlighted. In this case, a bounding circle 152 highlights a portion of line 156, which extends too far. Similarly, a bounding circle 154 highlights angle 158, which is not exactly 90 degrees. The corresponding text report in window 144 shows that line 156 is too long and angle 158 is not 90 degrees. However, the report may be of any level of detail, including an indication of precisely how many pixels or degrees as the case may be, the relevant graphic element is from the reference graphic. Additionally, in one embodiment where SVG is used the report may be in the form of an identification of the differences between the XML tags as found by the comparison routine 122. For example, a portion of the report may read "line 156 is length X and should be length Y" or "line 156 ends at $X_1$, and should end at $X_0$."

Figure 2:
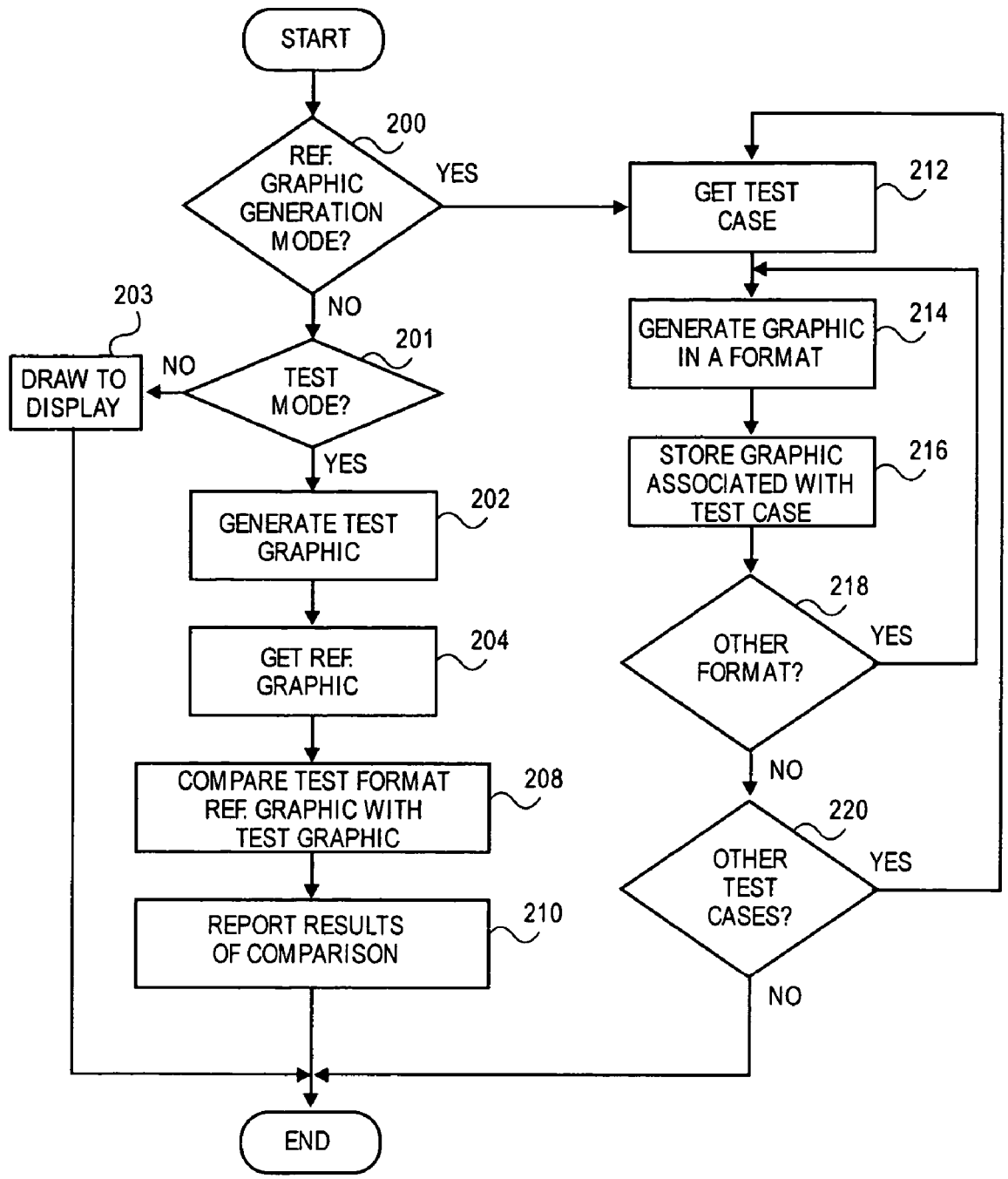
FIG. 2 is a flow diagram of an operation in one embodiment of the invention.

FIG. 2 is a flow diagram of an operation in one embodiment of the invention. At decision block 200, a determination is made whether the system is in reference graphic generation mode. If the system is in reference graphic generation mode, a test case is retrieved from storage. In one embodiment, the test case is merely the data required to generate a reference graphic. In another embodiment, where the graphics program is Java based, a test case may be a Java class. Once the system gets the test case, it generates a graphic in a format at block 214. In one embodiment, this may be the result of the graphics commands being diverted to a non-standard library. By "non-standard," it is meant only that the library is not the one used by the graphics program in normal mode. At block 216, the generated graphic is stored in association with the test case in, for example, a reference graphic repository as discussed above. At decision block 218, a determination is made if there are additional formats to be supported. If there are graphics in the additional format are generated and stored by repeating blocks 214 and 216 for the additional format(s). In one embodiment, the commands are routed to libraries of all supported formats simultaneously. Thus, making the decision at block 218 implicit. If there are no other formats to be supported, a determination is made for other test cases to generate reference graphics for at decision block 220. If there are, the routine repeats from block 212.

At decision block 200, if the system is not in reference graphic generation mode, a determination is made if the system is in test mode at decision block 201. If the decision is not in test mode, it is deemed to be in normal mode and the graphics command generated are merely drawn to the display at block 203. Alternatively, if the system is in test mode at decision block 201. Test format graphic is generated at block 202. To get the test format graphic, the system may divert the graphics commands from a graphics program to a test format library. The generated test graphic is passed to the test suite for testing. At block 204, a reference graphic is retrieved from storage. As noted previously, the storage may be a reference graphic repository, non-volatile storage or may be previously loaded into volatile memory. In some embodiments, more than one format of the reference graphic is retained in the reference repository. In such embodiments, the retrieved reference graphic should be of the same format as the test graphic generated.

At block 214, the test format of the reference graphic and the test format of the test graphic are compared. In one embodiment in which a bitmap is used as the test format, the comparison will generate a list of pixels that differ between the test graphic and the reference graphic. In another embodiment, using SVG as the test format, the comparison may identify discrepancies in lines, angles, or other graphical elements less granular than pixels.

The results of the comparison may be reported to a user at block 216. In one embodiment, the report may take the form of a purely text report driven to the display, the printer, or both. In another embodiment, the report may be a purely graphical report driven to the display, the printer, or both. In another embodiment, the report may combine both a text and graphic report and drive it to the display, the printer, or both.

Notably, the developer of the graphics program need not concern itself with the test format to be used whether SVG or otherwise. By providing the simple API that permits the plug-in to divert the graphics commands, the testing can proceed independently of the hardware platform, programming language and graphics libraries used. While it is still necessary to create the reference cases to test against, it is not necessary that they are developed in the same languages as the test case. For example, a case may exist where a graphic is ported from, e.g., Java to C++, it is still desirable to produce the same output. In some embodiments, the described system permits cross language testing as the testing is independent of the development language and the language in which the reference cases were created.

A developer of the graphics program can facilitate both the reference graphic creation mode and the test mode with the addition of minimal code. The added code should i) initialize a non standard graphic library (e.g., the SVG library), ii) draw the picture into the non-standard context (e.g., the SVG context) iii) store the picture (reference graphic) using an API provided by the test suite, and iv) call the test suite to perform comparisons. Reference graphic generation mode uses i, ii, and iii, while test mode uses i, ii, iv. These four additions should require minimal coding and do not require code to draw the graphic twice.

Figure 3:
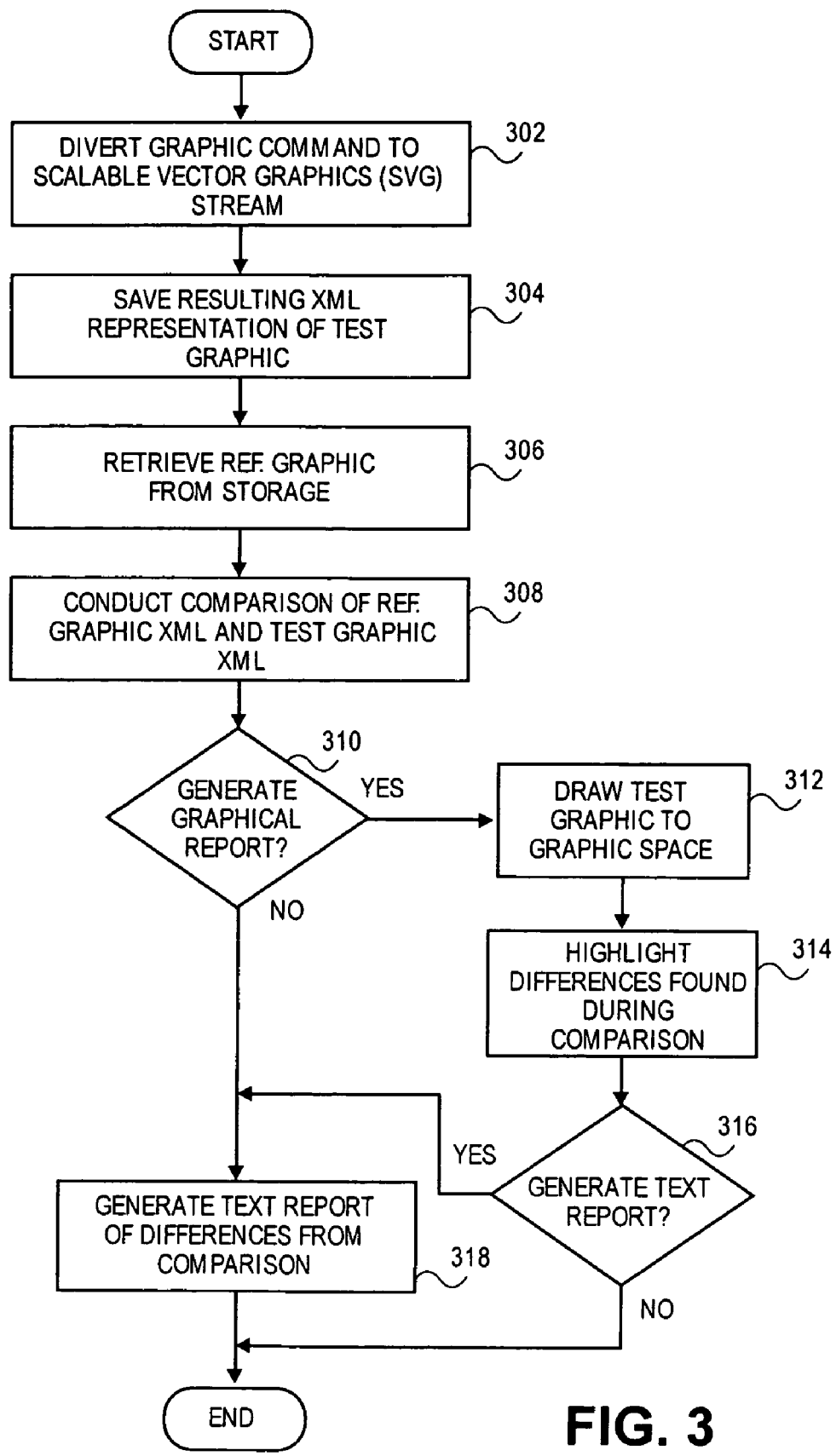
FIG. 3 is a flow diagram of operation in an alternative embodiment of the invention.

FIG. 3 is a flow diagram of operation in an alternative embodiment of the invention. At block 302, graphics commands are diverted to an SVG stream. The resulting XML representation of the test graphic is saved at block 304. A reference graphic is retrieved from storage at block 306. Reference graphic is presumed to be in SVG format. At block 308, a comparison is conducted between the reference graphic XML and the test graphic XML. This comparison may be performed on a tag-by-tag basis and unlike a bitmap comparison, provides an indication that graphic elements, such as a line, angle, or other primitive failed the comparison tests and the basis for such failure, not merely that a particular pixel is incorrect. While XML is a preferred industry metalanguage, other vector formats that are represented in other metalanguages could be used. For example, a format represented in vector markup language (VML) or dynamic hypertext markup language (DHTML) could be used as the test format.

A determination is made at decision block 310 whether a generation of graphical report is desired. If a graphical report should be generated, a test graphic is drawn to the graphic space of a display at block 312. Any differences found during the comparison may be highlighted at block 314. At decision block 316, a determination is made whether to generate a text report. In most instances, it will be desirable to generate a text report in addition to the graphical report. If the text report should be generated at block 316 or if no graphical report should be generated, the text report is generated to report the differences from the comparison at block 318. The generated report, text, graphical or both may be driven to the display, the printer, or both. In this manner, the output of graphics programs may be automatically tested saving both time and development costs while simultaneously increasing the accuracy of the testing.

While embodiments of the invention are discussed above in the context of flow diagrams reflecting a particular linear order, this is for convenience only. In some cases, various operations may be performed in a different order than shown or various operations may occur in parallel. It should also be recognized that some operations described with respect to one embodiment may be advantageously incorporated into another embodiment. Such incorporation is expressly contemplated.

Elements of embodiments may also be provided as a machine-readable medium for storing the machine-executable infractions. The machine-readable medium may include, but is not limited to, flash memory, optical disks, CD-ROMs, DVD ROMs, RAMs, EPROMs, EEPROMs, magnetic or optical cards, or other type of machine-readable media suitable for storing electronic instructions.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

In the foregoing specification, the invention has been described with reference to specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense.

The invention claimed is:

1. A method comprising:
   providing a reference graphic;
   generating a test graphic in a format common to the reference graphic wherein generating includes diverting graphics commands to a scalable vector graphics (SVG) format library; and
   automatically comparing the reference graphic with the test graphic to identify differences.

2. The method of claim 1 further comprising:
   highlighting differences identified in the test graphic.

3. The method of claim 1 further comprising:
   generating a report of differences between the reference graphic and the test graphic.

4. The method of claim 1 wherein automatically comparing comprises:
   conducting a comparison of an extensible markup language (XML) representation of the test graphic and the reference graphic.

5. The method of claim 4 wherein conducting a comparison comprises:
   performing a tag by tag comparison of the XML representation of the test graphic and the reference graphic.

6. A computer readable media containing instruction which when executed by a processor cause the processor to:
   divert graphics commands to a scalable vector graphics (SVG) stream to create a test graphic;
   retrieve a reference graphic from a memory; and
   automatically compare the test graphic with the reference graphic to identify differences.

7. The machine-accessible medium of claim 6 containing further instructions that, when executed, cause a machine to:
   perform a tag by tag comparison of the XML representation of the test graphic and the reference graphic.

8. The machine-accessible medium of claim 6 containing further instructions that, when executed, cause a machine to:
   highlight differences identified in the test graphic.

9. The machine-accessible medium of claim 6 containing further instructions that, when executed, cause a machine to:
   generate a report of differences between the reference graphic and the test graphic.

10. A system comprising:
    a repository to retain a reference graphic;
    a graphics program to create graphics commands;
    a hook to divert the graphics commands to a test format library to create a first graphic in a test format; and a test module to compare the first graphic in the test format with the reference graphic in the test format.

11. The system of claim 10 wherein the test module comprises;
a report generation routine to generate a report of differences between the reference image and the first graphic.

12. The system of claim 11 wherein the report comprises:
a graphical highlighting of the differences in the first graphic.

13. An apparatus comprising:
means for creating a reference graphic and a test graphic; and
means for automatically comparing the test graphic with the reference graphic to identify differences; and
means for graphically highlighting the differences on the test graphic.

* * * * *